April 19, 1932. C. SEMENITZ 1,854,864

METAL FILM OR LAMINA FOR USE IN CINEMATOGRAPHY

Filed July 28, 1930

Inventor:
Christian Semenitz
by Lorra & Kellenbeck
Attorneys

Patented Apr. 19, 1932

1,854,864

UNITED STATES PATENT OFFICE

CHRISTIAN SEMENITZ, OF BERLIN-CHARLOTTENBURG, GERMANY, ASSIGNOR TO REINHOLD KUPFER, OF BERLIN-CHARLOTTENBURG, GERMANY

METAL FILM OR LAMINA FOR USE IN CINEMATOGRAPHY

Application filed July 28, 1930, Serial No. 471,143, and in Germany May 10, 1929.

The present invention relates to improvements in or relating to metal films or laminæ for use as cinematograph films for the projection of pictures by reflected light.

In projecting cinematograph pictures from metal films by means of reflected light it has been found that the projected pictures are defective as to depth and sharpness.

It is an object of the present invention to remedy this defect in a simple and efficient manner.

According to the present invention I provide a metal film, lamina or the like for use as a cinematograph film for the projection of pictures by reflected light characterized by the provision of concave depressions on its surface.

According to the present invention also I provide a method of manufacturing a film for use in cinematograph projection by reflected light comprising forming concave depressions on the surface of a metal film or lamina.

The concave depressions may take the form of fine grooves running parallel and in the case of a film longitudinally of the film or of small depressions of circular or other suitable shape. In either case the depressions may be of circular, parabolic or other suitable cross section.

In order that the invention may be well understood, a preferred embodiment thereof will be described by way of example as applied to a film, with reference to the accompanying drawings in which.

Figure 1:
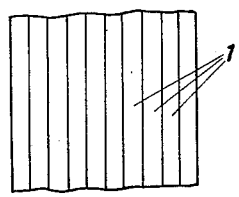
Figure 1 is a front view of a preferred form of metal film the grooves being considerably magnified.
Figure 2:
Figure 2 is a section.

The film illustrated in Figures 1 and 2 is provided with a plurality of very fine grooves 1. The grooves may be produced on the film by passing the film between suitably shaped and arranged rollers. This form of film is particularly suited for use with two sources of light for illuminating the fluted surface of the film which also bears the picture record the two sources of light being disposed symmetrically on either side of the film.

Figure 3:
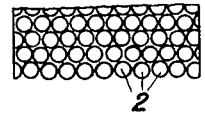
Figures 3 and 4 are views similar to Figures 1 and 2 respectively of a modified form of film.
Figure 4:

In cases where a plurality of sources of illumination are grouped round the picture on the film to be projected by reflected light it is preferable to employ a film such as illustrated in Figures 3 and 4. The surface of the film which is to carry the picture is provided with a plurality of extremely small spherical, paraboloidal or other suitable concave depressions 2. In this manner a uniform shadowless illumination of the picture surface is obtainable.

In either case the depressions, grooves or the like operate as concave cylindrical spherical or otherwise curved mirrors so that an extraordinary degree of light concentration is obtained. On metal surfaces so formed there appear details of form and colour which the eye is otherwise in general unable to perceive. Graduations of light of the picture are modified to a certain extent so that the picture gains to an extraordinary degree in depth and the whole effect is more plastic and natural and consequently more artistic. Apart from this by the use of a metal film which is formed as above described scratches on the film are rendered imperceptible in the projected picture.

It has been found that the plastic effect is dependent on the fineness of the fluting, depression or the like and increases with the degree of fineness. In order to obtain a specially fine fluting, the plane surface of the metal film which is to receive the pictures and project the same by reflection is brushed with rotating brushes having bristles of fine metal wire, glass threads or even stiff animal bristles. The film is traversed longitudinally past the rotating brush or the brush is traversed along the film so as to produce fine flutings running parallel with the longitudinal edges of the film which is of course to be illuminated by light projected on to it at right angles to the length of the film.

It is to be understood that the invention is also applicable to metal projection screens since in this case also the projected picture gains in brightness and depth as compared with those projected on to the usual screens.

Whilst in the foregoing preferred embodiments of the invention have been described in detail it is to be understood that various modifications may be made without departing from the scope thereof.

Having now particularly described and ascertained the nature of my said invention and in what manner the same is to be performed, I declare that what I claim is:—

1. A metal film serving as a support for cinematographic pictures, having its picture bearing surface provided with a plurality of concave depressions of regular shape.

2. A metal film serving as a support for cinematographic pictures, having its picture bearing surface provided with a plurality of parallel grooves.

3. A metal film serving as a support for cinematographic pictures, having its picture bearing surface provided with a plurality of fine parallel grooves of cylindrical curvature.

4. A metal film serving as a support for cinematographic pictures, having its picture bearing surface provided with a plurality of fine parallel grooves of parabolic cross section.

5. A metal film serving as a support for cinematographic pictures, having its picture bearing surface provided with a plurality of concave depressions of spherical curvature.

6. A metal film serving as a support for cinematographic pictures, having its picture bearing surface provided with a plurality of fine parallel longitudinally extending grooves.

In testimony whereof I have affixed hereunto my signature.

CHRISTIAN SEMENITZ.